United States Patent
Mizouchi et al.

(10) Patent No.: US 6,946,089 B2
(45) Date of Patent: Sep. 20, 2005

(54) METHOD FOR PRODUCING FOAM (75) Inventors: Hiroyuki Mizouchi, Tokyo (JP); Katsuaki Morino, Tokyo (JP); Junji Koujina, Tokyo (JP)

(73) Assignee: JSR Corporation, Tokyo (JP)

( * ) Notice: Subject to any disclaimer, the term of this patent is extended or adjusted under 35 U.S.C. 154(b) by 353 days.

(21) Appl. No.: 10/048,496

(22) PCT Filed: Jun. 13, 2001

(86) PCT No.: PCT/JP01/05023

§ 371 (c)(1),
(2), (4) Date: Apr. 30, 2002

(87) PCT Pub. No.: WO01/96083

PCT Pub. Date: Dec. 20, 2001

(65) Prior Publication Data

US 2002/0195735 A1 Dec. 26, 2002

(30) Foreign Application Priority Data

Jun. 16, 2000 (JP) .................................. 2000-181937

(51) Int. Cl.$^7$ ..................... B29C 44/10; B29C 44/60
(52) U.S. Cl. .................. 264/40.5; 264/45.2; 264/51
(58) Field of Search ................... 264/40.1, 40.3, 264/40.5, 45.1, 45.2, 45.8, 46.2, 51, 299, 313; 425/149

(56) References Cited

U.S. PATENT DOCUMENTS 3,970,732 A * 7/1976 Slaats et al. ............... 264/40.5
4,765,935 A * 8/1988 Fiorentini .................. 264/40.5
4,851,167 A * 7/1989 Marc ......................... 264/421
5,169,574 A * 12/1992 Leung et al. .............. 264/40.5
5,207,957 A * 5/1993 Heath et al. ............... 264/40.5

FOREIGN PATENT DOCUMENTS

| EP | 876891 | 11/1998 |
| JP | 58-167140 | 10/1983 |
| JP | 4-113822 | 4/1992 |
| JP | 6-320591 | 11/1994 |
| JP | 7-100841 | 4/1995 |
| JP | 08-336853 | 12/1996 |

* cited by examiner

*Primary Examiner*—Angela Ortiz
(74) *Attorney, Agent, or Firm*—Oblon, Spivak, McClelland, Maier & Neustadt, P.C.

(57) ABSTRACT

The invention relates to a process and apparatus for producing a foamed body that allows simple control of the dimensions and gives foamed body with the desired dimensions in a stable manner. According to the invention, P2 is pressure at the point where pressure in the die begins to fall after casting a molding material containing no blowing agent into the die, ΔP2 is the amount of reduction in pressure in the die from P2, P3 is the minimum pressure between the time of casting a molding material containing a blowing agent into the die completely cast and the time of beginning to increase the pressure in the die, ΔP3 is the amount of increase in pressure in the die from P3, and ΔP4 is the sum of ΔP2 and ΔP3. A blowing agent and a molding material are cast into a pressure sensor-equipped die having a guide pin exposed on the inner wall of the die and in direct contact with the molding material and a pressure sensor which detects pressure inside the die via the guide pin, and ΔP4 is controlled based on the correlation between the dimensional change and ΔP4 for a previously obtained foamed body, in order to obtain foamed body with the desired dimensions.

4 Claims, 7 Drawing Sheets

METHOD FOR PRODUCING FOAM

TECHNICAL FIELD

The present invention relates to a process and an apparatus for producing a foamed body. More specifically, it relates to a process for producing a foamed body that allows simple control of the dimensions of obtained foamed body in order to yield the desired dimensions in a stable manner, and an apparatus for producing a foamed body that allows simple control of the dimensions of the obtained foamed body in order to yield the desired dimensions in a stable manner.

BACKGROUND ART

Conventional processes are known for obtaining molded articles of resins and the like by control of molding apparatuses based on pressure, and for example, a technique for obtaining particularly thin foamed body is disclosed in JP-A-8-336853. However, such conventional processes for obtaining molded articles utilize data of outside the die obtained from a sensor. Yet, no production process or production apparatus is known for obtaining foamed body, in particular, using pressure inside the die. The process disclosed in JP-A-8-336853 mentioned above also does not use data for pressure inside the die.

Disclosure of Invention

It is an object of the present invention, which has been accomplished under these circumstances, to provide a production process that allows simple control of the dimensions and stably gives foamed body with the desired dimensions, as well as a production apparatus that allows simple control of the dimensions and stably gives foamed body with the desired dimensions.

The present inventors have installed a pressure sensor inside a die for foam molding and have succeeded in recording pressure changes inside the die using the sensor. Studying the recorded pressure changes and the dimensions of the obtained foamed body, it was found that a simple correlation exists between the prescribed pressure and the dimensions of the obtained foamed body, that may be approximated by a line. It was further found that the dimensions of obtained foamed body can be accurately reproduced based on the prescribed pressure, and the present invention was thus completed.

The process for producing a foamed body according to the invention is characterized in that, where the minimum pressure between the time of casting a molding material containing a blowing agent into a die completely and the time of beginning to increase a pressure inside the die is designated as P1, and the pressure change inside the die from P1 is designated as $\Delta P1$, the dimensions of the obtained foamed body are adjusted based on $\Delta P1$.

The "molding material" used for the invention may be either a "non-shrinking molding material" or a "shrinking molding material", but will normally be a "non-shrinking molding material". Here, a "non-shrinking molding material" is a molding material with a low degree of shrinkage during molding, and specifically it is a molding material with a pressure reduction of 0.5% or less inside the die when the non-shrinking molding material containing no blowing agent is cast into the die under molding conditions and molded (excluding pressure reduction produced by initial softening of the molding material by the die temperature). That is, it includes, for example, molding materials which form foamed body with substantially no crosslinking structure, molding materials which are polymers such as epoxy resins and silicone resins which form a crosslinking structure but undergo virtually no shrinkage, and molding materials which are a mixture of polymers that shrink by crosslinking and polymers that do not shrink, and undergo substantially no shrinkage. A "shrinking molding material" is a molding material with a high degree of shrinkage during molding, and specifically it is a molding material with a pressure reduction of greater than 0.5% inside the die when the shrinking molding material containing no blowing agent is cast into the die under molding conditions and molded. That is, it includes molding materials which shrink due to formation of crosslinking.

"P1" is the minimum pressure between the time of casting the molding material into the die completely and the time of beginning to increase the pressure inside the die as foaming begins due to the temperature inside the die. The molding material usually softens by the die temperature immediately after it is cast into the die, and this reduces pressure inside the die. The minimum pressure may occur at this softening. On the other hand, when the degree of softening of the molding material is low or no softening occurs, the molding material is cast into the die, then the minimum pressure is the initial settled pressure (for example, the pressure at the point of pressure fluctuation inside the die begins to settle between 0.01% and 0.05%, within 0.1 seconds for an injection molding apparatus and within 1 second for a press molding apparatus).

"$\Delta P1$" is the amount of increase in pressure inside the die from P1. This increase occurs due to expansion of the molding material. $\Delta P1$ is a ordinarily changing value, and $\Delta P1$ may be observed either always or only at necessary times.

In the process for producing a foamed body according to the invention, the dimensions of a obtained foaming body may be adjusted by removal from the die at a point based on the size of $\Delta P1$. That is, a molding material with a fixed composition containing a foamed body, for example, a non-shrinking molding material, is cast and held in the die under constant molding conditions, and $\Delta P1$ alone is monitored. The material is then removed from the die when $\Delta P1$ reaches the prescribed value, thus allowing foamed body with the prescribed dimensions to be obtained in a stable manner without being affected by various errors produced during production (such as errors in the apparatus conditions which should be kept constant). Even when production condition shave been altered, adjusting $\Delta P1$ will allow foamed body with the same dimensions to be obtained.

The dimensions of numerous foamed body obtained by altering factors which change $\Delta P1$ may be measured to establish a correlation between $\Delta P1$ and the dimensions in advance, and $\Delta P1$ is adjusted by altering those factors using the correlation, thus allowing adjustment of the dimensions of the foamed body. These "factors" include the types and proportions of the blowing agent, polymer or copolymer of the "molding material", as well as the die temperature, the die clamping pressure in the apparatus which controls the die, the time to die-removal (die holding time), the casting pressure into die, the casting rate into the die, etc., and represents all of the parameters that can alter pressure in the die. Among these, the casting pressure into the die, the casting rate into the die and the time to die-removal are particularly preferred for use as "factors".

According to the process for producing a foamed body of the invention, changes in the dimensions of foamed body depending on the various factors are measured to obtain a correlation between $\Delta P1$ and the dimensional changes, thus enabling calculation of the value of $\Delta P1$ for obtaining foamed body of the target dimensions. Thus, by approximating the intended target value of $\Delta P1$ based on these factors, it is possible to obtain foamed body with the desired dimensions. Since the correlation can generally be approximated by a line, the adjustment of $\Delta P1$ can usually be accomplished in a simple manner. Also, by using a molding apparatus provided with at least a controller having a memory which stores the correlation and a computer which performs the necessary computations, it is possible to automatically control the die-removal period based on feedback of the optimum control method which has been calculated based on the correlation stored in the controller. Similarly, control of the die clamping pressure, the casting pressure into the die, etc., may also be controlled based on this feedback.

Another aspect of the process for producing a foamed body according to the invention is characterized in that the dimensions of an obtained foamed body are adjusted based on $\Delta P4$ defined as the sum of the following $\Delta P2$ and $\Delta P3$.

$\Delta P2$: The amount of reduction (absolute value) in pressure in the die from P2, where P2 is the pressure at the point where pressure in the die begins to fall after casting the molding material containing no blowing agent into the die.

$\Delta P3$: The amount of increase (absolute value) in pressure in the die from P3, where P3 is the minimum pressure between the time of casting the molding material containing the blowing agent into the die completely and the time of beginning to increase the pressure in the die.

According to another aspect of the process for producing a foamed body of the invention, the "molding material" may be either a "non-shrinking molding material" or a "shrinking molding material", but using a "shrinking molding material" is particularly preferred to allow more precise adjustment of the dimensions of the foamed body. According to still another aspect of the process for producing a foamed body of the invention, molding a "non-shrinking material" may be preferred as it will allow particularly precise adjustment of the dimensions of the foamed body.

According to yet another aspect of the process for producing a foamed body of the invention, "P2" may be the initial settling pressure after the molding material containing no blowing agent has been cast into the die (for example, the pressure at the point of pressure fluctuation inside the die begins to settle between 0.01% and 0.05%, within 0.1 seconds for an injection molding apparatus and within 1 second for a press molding apparatus). The fall in pressure may be produced, for example, due to softening of the molding material, such as a shrinking molding material, or due to crosslinking shrinkage of the polymer in a shrinking molding material. Here, "$\Delta P2$" is the amount of change in pressure in the die from P2, and according to another aspect of the invention, $\Delta P2$ is a falling value because the material undergoes crosslinking shrinkage.

According to yet another aspect of the process for producing a foamed body of the invention, "P3" is the minimum pressure between the time of casting the molding material with the same composition as for measurement of P2 into the die completely and the time of beginning to increase the pressure in the die, in addition to containing the forming agent. Here, "$\Delta P3$" is the amount of increase in pressure in the die from P3. The value of $\Delta P3$ is a positive value because the obtained molded article is a foamed body. Both $\Delta P2$ and $\Delta P3$ are ordinarily changing values, and they may be observed always or only at the necessary times.

According to yet another aspect of the process for producing a foamed body of the invention, the dimensions of an obtained foamed body may be adjusted by removal from the die based on the size of "$\Delta P4$", for example, removal from the die when $\Delta P4$ reaches a prescribed value. Specifically, by monitoring only "$\Delta P4$" instead of "$\Delta P1$" in the aspect of the foamed body production process according to the invention described above, it is possible to stably obtain foamed body with the prescribed dimensions in the same manner. Even when the production conditions have been altered, adjusting "$\Delta P4$" will allow foamed body with the same dimensions to be obtained, in the same manner as described above.

Similar to the aspect of the foamed body production process according to the invention described above, the dimensions of numerous foamed body obtained by altering factors which change "$\Delta P4$" may be measured to establish a correlation between "$\Delta P4$" and the dimensions in advance, and $\Delta P4$ is adjusted by altering those factors using the correlation, thus allowing adjustment of the dimensions of the obtained foamed body, and control by feedback is also possible. The "factors" according to another aspect of the invention are the same as for the aspect described above, except that they may also include types and proportions of the crosslinking agent if desired.

For the "non-shrinking molding material" and "shrinking molding material" according to this and other aspects of the present invention, there are no particular restrictions on the polymer forming the main phase of the foamed body, and any resin, rubber, elastomer or mixture thereof may be used, with either a thermoplastic or thermosetting property. Preferred for use are those with excellent melt flow properties.

As such resins there may be mentioned polyethylene-based resins, polypropylene-based resins, polystyrene-based resins, polyvinylacetate-based resins, polyvinylchloride-based resins, polyacrylonitrile-based resins, polycarbonate-based resins, fluorine-based resins, acryl-based resins, urethane-based resins, phenol-based resins, epoxy-based resins, unsaturated polyester-based resins, alkyd-based resins, urea-based resins, melamine-based resins, silicone-based resins, polyvinylidenechloride-based resins, styrene-butadiene-based resins and the like.

As rubbers there may be mentioned butadiene-based rubber, styrene-butadiene-based rubber, acrylonitrilebutadiene-based rubber, chloroprene-based rubber, isoprene-based rubber, ethylene-propylene-based rubber, ethylene-propylene-diene-based rubber, urethane-based rubber, silicone-based rubber and the like.

As elastomers there may be mentioned styrene-based elastomers, polyurethane-based elastomers, polyester-based elastomers, fluorine polymer-based elastomers and polyamide-based elastomers, as well as 1,2-polybutadiene, vinyl bond-rich styrene-butadiene block copolymers, and the like.

The "blowing agent" used for this and other aspects of the present invention may be an inorganic blowing agent or an organic blowing agent. As inorganic blowing agents there may be used sodium bicarbonate, ammonium bicarbonate, ammonium chloride, sodium carbonate, ammonium carbonate and the like. As organic blowing agents there may be used azodicarbonamide, dinitrosopentamethylenetetramine, dinitrosoterephthalamide, azobisisobutyronitrile, barium azodicarboxylate, sulfonyl hydrazides such as toluenesulfonyl hydrazide, and the like. These may be used alone or in combination of two or more. Such blowing agents may also be used in combination with foaming aids such as urea, urea derivatives or the like.

For this and other aspects of the foamed body production process of the invention, there may be used a crosslinking agent that can crosslink at least one of the polymers of the main phase. A peroxide-based crosslinking agent may be used as the crosslinking agent, or if a sulfur-based crosslinking agent can accomplish the crosslinking, it may be used. These may also be used simultaneously. As sulfur-based crosslinking agents there may be used sulfur, thiurams such as dipentamethylenethiuram, and sulfur compounds such as tetrasulfide. As peroxide-based crosslinking agents there may be used particularly organic peroxides, and be used di-tert-butylperoxy-3,3,5-trimethylcyclohexane, dicumyl peroxide, n-butyl(4,4-bis-tert-butylperoxy) valerate, di-tert-butylperoxy-di-isopropylbenzene, 1,1-bis(tert-butylperoxy) cyclododecane, 2,5-dimethyl-2,5-di(tert-butylperoxy) hexane, 2,5-dimethyl-2,5-di(tert-butylperoxy)hexyne and the like. These may be used alone or in combination of two or more.

A crosslinking accelerator may also be used in addition to the crosslinking agent. As crosslinking accelerators there may be used p-quinonedioxime, p-benzoquinonedioxime, N,N'-m-phenylenedimaleimide, dipentamethylenethiuram pentasulfide, triallyl cyanurate, triallyl isocyanurate, ethyleneglycol dimethacrylate, diethyleneglycol dimethacrylate, polyethylene dimethacrylate, neopentylglycol dimethacrylate, trimethylolpropane triacrylate, erythritol tetramethacrylate, trimethylolpropane trimethacrylate, trimethacrylate, dimethacrylate, divinyl adipate, liquid polybutadiene rubber, magnesium diacrylate, zinc acrylate, stannous acrylate, zinc methacrylate, magnesium methacrylate, zinc dimethacrylate, and the like. These may also be used alone or in a combination of two or more.

These crosslinking agents and crosslinking accelerators are normally included in "shrinking molding materials", but may also be included in "non-shrinking molding materials".

In particular, in order to obtain a foamed body requiring excellent dimensional stability and excellent foamability, such as a foamed body to be used as a shoe sole, packaging material, cushion material, heat insulating material, seal or the like, it is preferred to use a molding material (non-shrinking molding material or shrinking molding material) containing a mixture of a rubber and an elastomer. Such molding materials exhibit both the properties of elastomers which easily melt upon heating and have excellent flow properties upon melting, and rubbers which have excellent rubber elasticity, flexibility and softness.

In the case of a molding material containing a mixture of a rubber and an elastomer, any of the aforementioned rubbers may be included as the rubber, but butadiene rubber, isoprene rubber, styrene-butadiene rubber and the like are preferred for use. 1,2-polybutadiene, styrene-butadiene block copolymer, polyethylene, polyvinyl acetate and the like are preferred for use as elastomers. Any of the aforementioned blowing agents may be used as the blowing agent. The blowing agent content is preferably 0.01–10 (more preferably 0.1–5) wt % with respect to 100 wt % as the total of the resin, rubber and elastomer. When a crosslinking agent is used, dicumyl peroxide, t-butyl peroxide or the like is preferably used, and selected for suitability at the molding temperature.

There are no particular restrictions on the method for preparing the "non-shrinking molding materials" and "shrinking molding materials" to be used for this and other aspects of the invention, and they may be prepared using a kneading apparatus commonly used for mixture of organic materials (resins, rubbers, elastomers, etc.), such as a banbury mixer, pressure kneader, open roll or the like.

These "non-shrinking molding materials" and "shrinking molding materials" may also contain, in addition to the polymer, blowing agents, foaming aids, crosslinking agents and crosslinking accelerators mentioned above, other additives depending on the polymers and the purpose of use, such as fillers, reinforcers, lubricants, softeners, plasticizers, anti-aging agents, antioxidants, processing aids, scorch retarders, ultraviolet absorbers, tackifiers, waxes, photostabilizers, inner release agents, coloring agents, antimicrobial agents, flame retardants, peptizing agents, and the like. As fillers there may be used one or more from among carbon black or white fillers such as silica, calcium carbonate, talc, magnesium carbonate and the like. In addition to these there may be used one or more from among clay, balloons, fibers, rubbers, wood flour and the like. As dispersing agents there may be used one or more from among higher fatty acids and their metal salts or amide salts and the like. As plasticizers there may be used one or more from among phthalic acid derivatives, adipic acid derivatives, polyether esters and the like. As softeners there may be used one or more from among lubricating oils, process oils, castor oil and the like. As anti-aging agents there may be used one or more from among amines such as 4,4-($\alpha$, $\alpha'$-dimethylbenzyl)diphenylamine, etc., and imidazoles such as 2,2'-methylenebis(4-methyl-6-T-butylphenol), etc.

This and other aspects of the foamed body production process of the invention may employed for injection molding, press molding, transfer molding, blow molding, injection blow molding, vacuum molding, and the like. It is preferably employed for injection molding for better production efficiency. For these molding methods, as for extrusion molding, measurement of the amount of change in pressure in the die instead of merely pressure in the die according to this and other aspects of the invention will allow dimensions of the obtained foamed body to be adjusted on the basis of the amount of change.

According to this and other aspects of the foamed body production process of the invention, the dimensions of the obtained foamed body may be adjusted to allow adjustment of the specific gravity. Foamed body with the desired specific gravity can thus be obtained in a stable manner. The foamed body obtained by this and other aspects of the foamed body production process of the invention may be used for advantages in industrial products, cushioning materials (shoe sole materials, etc.), packaging materials, interior liner materials, and the like.

One aspect of the apparatus for producing a foamed body according to the invention is characterized by comprising a pressure sensor-equipped die having a guide pin exposed on the inner wall of the die and in direct contact with the molding material and a pressure sensor which detects pressure inside the die via the guide pin, and an adjustment means which adjusts $\Delta P1$ based on a pressure detection signal from the pressure sensor. A second aspect of the apparatus for producing a foamed body according to the invention is characterized by comprising a pressure sensor-equipped die having a guide pin exposed on the inner wall of the die and in direct contact with the molding material and a pressure sensor which detects pressure inside the die via the guide pin, and an adjustment means which adjusts $\Delta P4$ based on a pressure detection signal from the pressure sensor.

For both the first and second aspects of the foamed body production apparatus of the invention, the "molding material" may be either a "non-shrinking molding material" or a "shrinking molding material", and normally a "non-shrinking molding material" will be molded using a foamed body production apparatus according to the first aspect while a "shrinking molding material" will be molded using a foamed body production apparatus according to the second aspect. However, a "non-shrinking molding material" may be molded using a foamed body production apparatus according to the second aspect, and a "shrinking molding material" may be molded using a foamed body production apparatus according to the first aspect.

The foamed body production apparatus according to the first and second aspects of the invention allow stable adjustment of the dimensions of the obtained foamed bodies to the desired dimensions. The foamed body production apparatus according to the first and second aspects of the invention can provide the above-mentioned foamed body with particularly high efficiency when used for injection molding, and therefore it is preferably used for injection molding.

According to the foamed body production apparatus of the first and second aspects of the invention, the desired dimensions for foamed bodies are easily adjusted based only on the prescribed pressure, thus allowing the foamed body to be obtained in a simple and stable manner. The foamed body production apparatus according to the first and second aspects of the invention can also provide foamed body of the desired dimensions in a stable and efficient manner without being dependent on the molding apparatus or the conditions set for the molding apparatus.

BEST MODE FOR CARRYING OUT THE INVENTION

The present invention will now be explained in greater detail by way of examples, comparative examples and the attached drawings, with the understanding that the invention is in no way limited thereby.

[1] Foamed Body Production Apparatus (Press Molding Apparatus)

Figure 1:
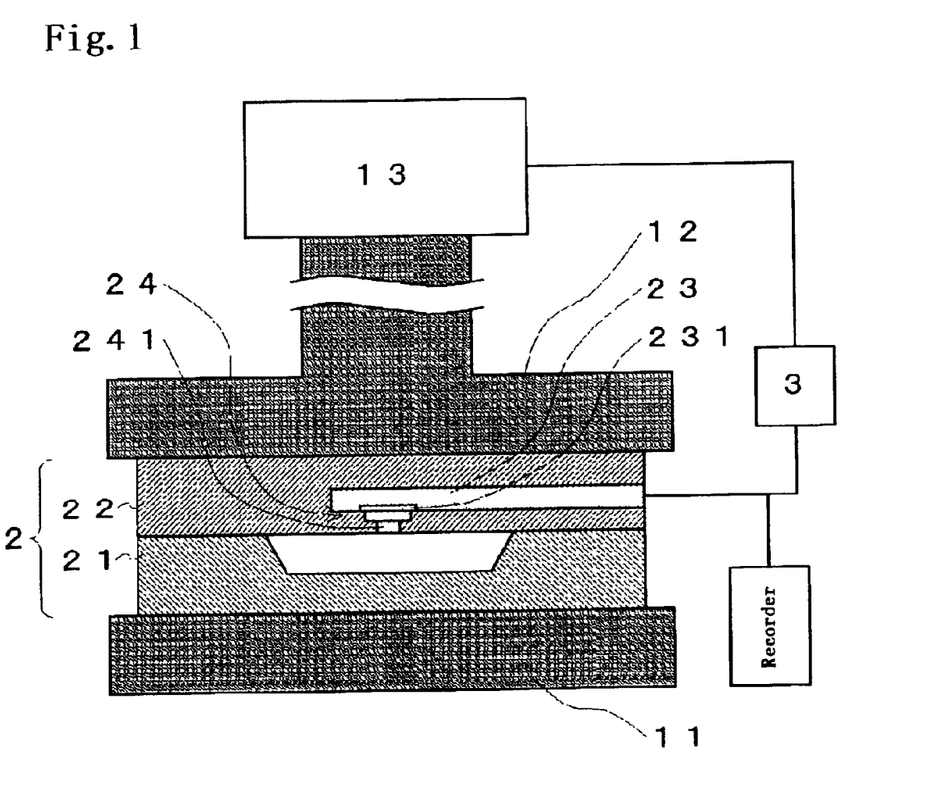
FIG. 1 is a cross-sectional view schematically showing an embodiment of a production apparatus for foamed body according to the invention.

FIG. 1 shows an embodiment of a production apparatus for foamed body according to the invention. The stationary mold 21 of a die 2 was mounted on a fixed end mounting plate 11 of the press molding apparatus 1 (Kansai Roll Co., Ltd. Model "145 TONPRESS"). The movable mold 22 of the die 2 was then mounted on a movable end mounting plate 12 of the press molding apparatus 1. The die 2 was pressed and clamped by a driving source (cylinder pump) 13 driving the movable end mounting plate 12. A pressure sensor 23 (Dynicos Co., Ltd. Model "ISA444") was situated at the center of the movable mold 22. A movable detecting pin 24 is in contact with the pressure sensor 23, and when the detector 231 of the pressure sensor 23 is pressed by pressure from inside the cavity, the pressure is outputted as an electrical signal to a controller 3. The controller 3 controls the driving source 13 in response to the pressure detection signal received from the pressure sensor 23, thus allowing adjustment of the clamping pressure. The detection pin 24 has a shape with cylinders of different diameters adhesively anchored in a concentrical fashion, with 5 mm (or 3–7 mm, with 4–6 mm being preferred) set as the diameter at the bottom 241 and ±0.005 mm (or ±0.01 mm, with +0.007 mm being preferred) as the clearance between the movable mold 22 and the perimeter surface of the bottom 241 of the detection pin. The clearance is preferably not too large as this presents a risk that the foamed body material cast into the die may infiltrate the gap. On the other hand, if it is too small it becomes difficult to accurately measure the pressure due to friction with the movable mold 22 itself. The shape of the cavity of the die 2 is as shown in FIG. 1, with a length of 220 mm and a width of 120 mm at the top, and a maximum depth of 4 mm. The four sides in the thickness direction are inclined at a slope of 45°. The outer shape of the die has 260 mm length, 260 mm width and 30 mm thickness for both the stationary mold and the movable mold.

[2] Production of Foamed Body (1) Preparation of Molding Material

A starting material with the composition shown in Table 1 was kneaded with a banbury mixer to obtain molding materials 1 through 4. (Molding material 1 as a comparative example containing no blowing agent, and molding materials 2 through 4 as shrinking molding materials.) The details regarding each of the starting materials in Table 1 were as follows.

(1) Thermoplastic elastomer: 1,2-polybutadiene, JSR Corporation, trade name "RB830"

(2) Isoprene rubber: JSR Corporation, trade name "IR2200"

(3) Butadiene rubber: JSR Corporation, trade name "BR 02LL"

(4) Anti-Aging agent: Sumitomo Chemical Co., Ltd., trade name "SUMILIZER TNP-N"

(5) Crosslinking agent: 40% diluted product, Nippon oil and fats Co., Ltd., trade name "Dicumyl peroxide"

(6) Blowing agent: Eiwa Chemical Industries Co., Ltd., trade name "VINYFOR FZ80"

(2) Molding of Articles to Determine Correlation

Figure 2:
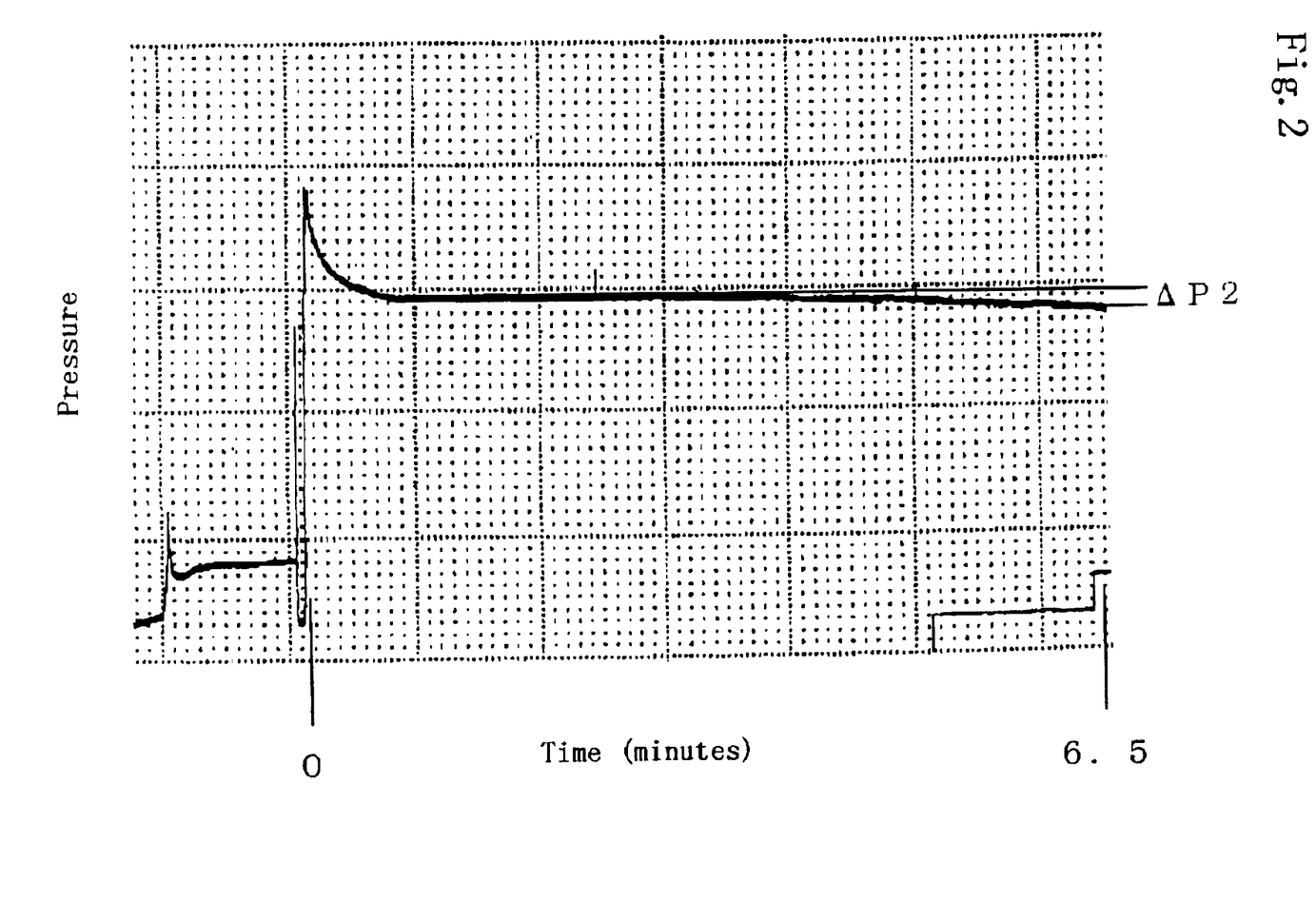
FIG. 2 is a graph showing pressure fluctuation in a die during molding of molding material 1.
Figure 3:
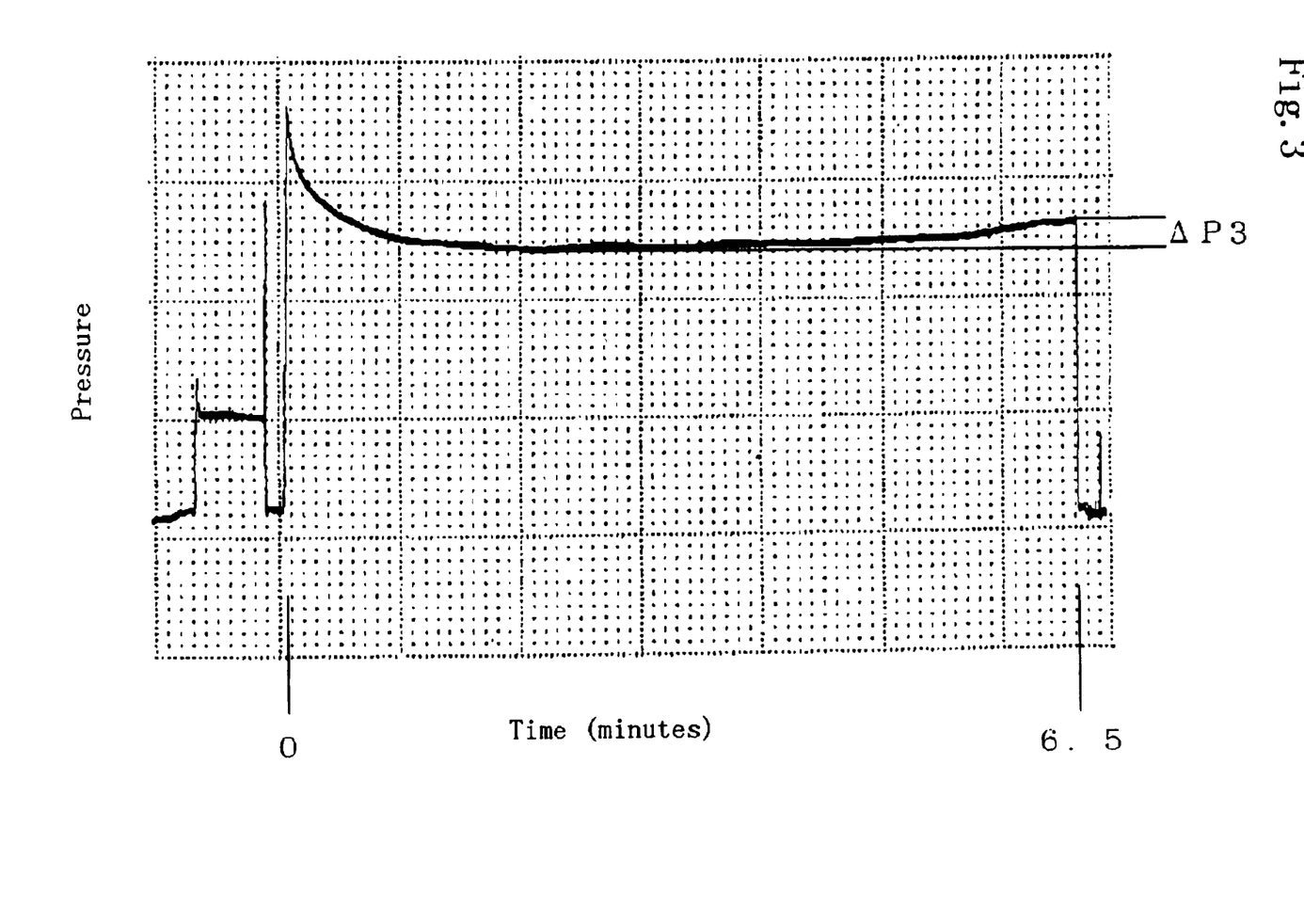
FIG. 3 is a graph showing pressure fluctuation in a die during molding of molding material 2.
Figure 4:
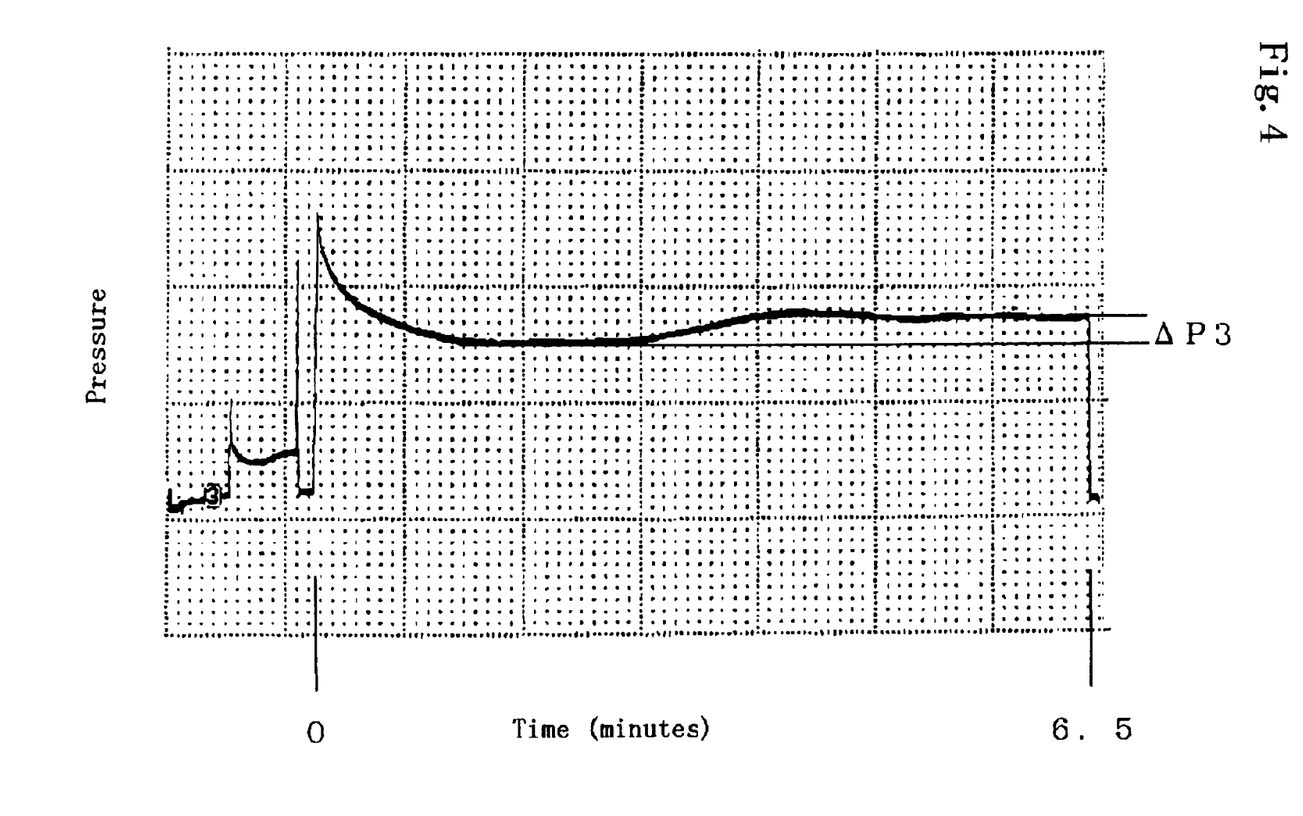
FIG. 4 is a graph showing pressure fluctuation in a die during molding of molding material 3.
Figure 5:
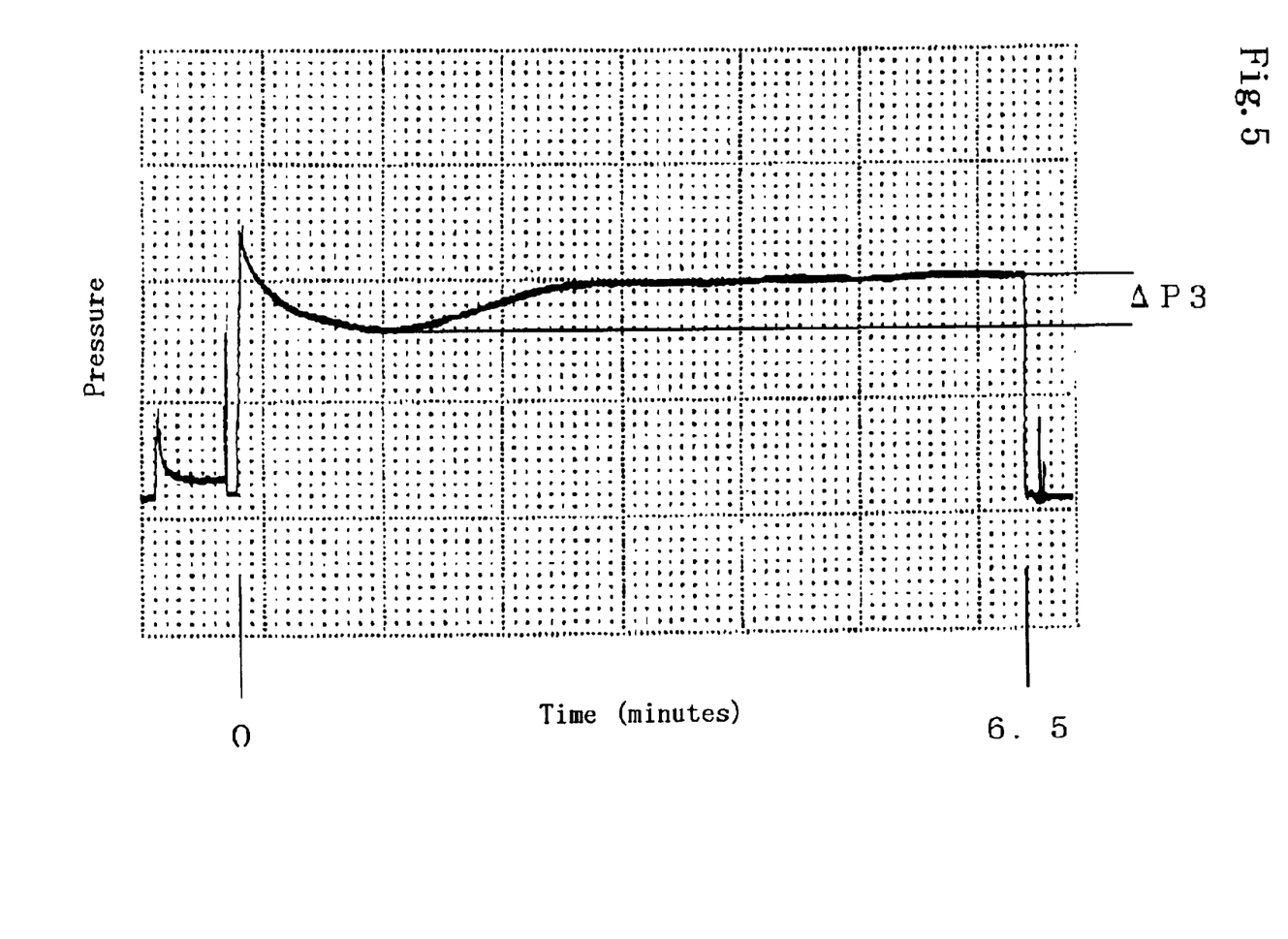
FIG. 5 is a graph showing pressure fluctuation in a die during molding of molding material 4.

Using the press molding apparatus described in [1] (without feedback from the pressure sensor), the die temperature was kept at 170° C. and molding materials 1 through 4 were each cast into the die. Keeping the die temperature at 170° C., the clamping pressure was set to 4 MPa and maintained for 6 minutes, 30 seconds. During that time, pressure in the die was constantly measured with the pressure sensor (23), and the data was outputted as graphs shown in FIGS. 2 through 5. FIG. 2 is for molded article 1 obtained from molding material 1 (comparative example), FIG. 3 is for molded article 2 obtained from molding material 2 (example), FIG. 4 is for molded article 3 obtained from molding material 3 (example) and FIG. 5 is for molded article 4 obtained from molding material 4 (example). Also, $\Delta P2$ and $\Delta P3$ were measured and $\Delta P4$ was calculated, according to the third aspect of the invention. The results are shown in Table 2.

(3) Dimensional Changes and Specific Gravity Changes of Obtained Molded Articles Ridges (not shown) were formed on the inner wall of the cavity of the die shown in FIG. 1 in order to transfer marks onto the cast molding material. The ridges resulted in transfer of depressions at a spacing of 200 mm in the lengthwise direction, a spacing of 100 mm in the widthwise direction and a spacing of 4 mm in the thickness direction, in each of the molding materials cast into the die. The spacings in the foamed body removed from the die then expanded, allowing measurements of the degree to which the dimensions of the molding material increased. The increases in dimensions from the molding material of the molded articles obtained in (2) were measured and the dimensional changes were calculated, based on these marks. The results are shown in Table 2. The specific gravitys of each of the obtained molded articles were also measured, and are shown in Table 2 as well.

Figure 6:
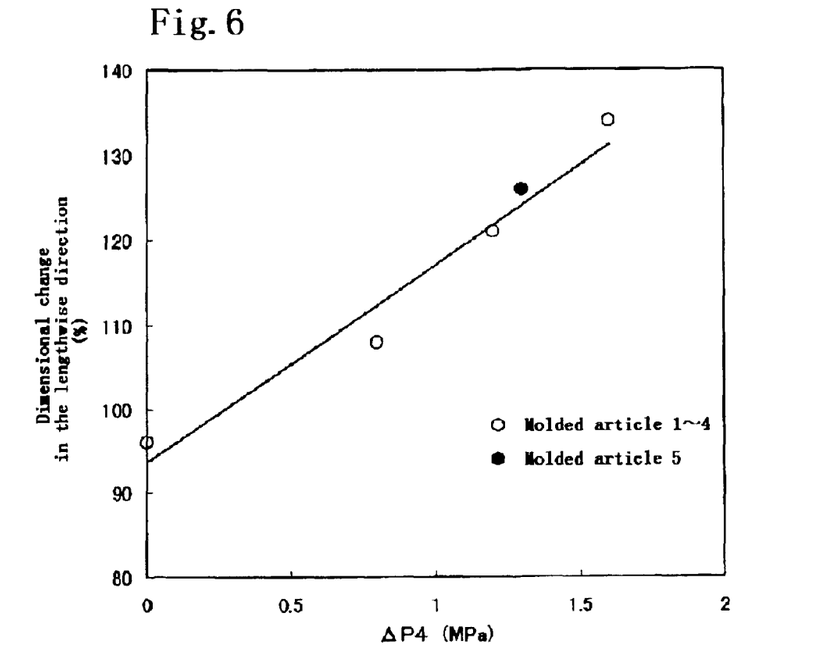
FIG. 6 is a graph showing the correlation between dimensional change in the lengthwise direction and $\Delta P4$.
Figure 7:
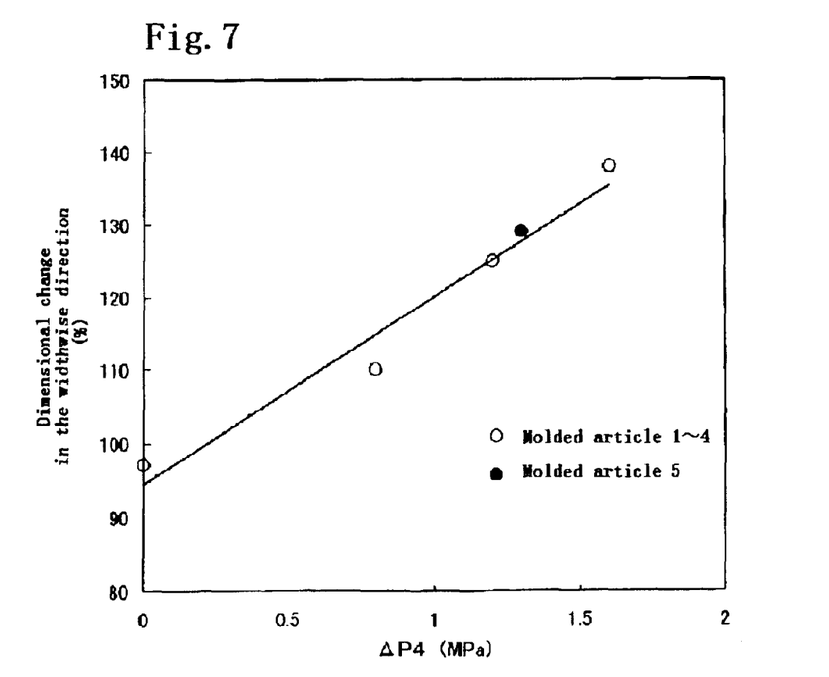
FIG. 7 is a graph showing the correlation between dimensional change in the widthwise direction and $\Delta P4$.
Figure 8:
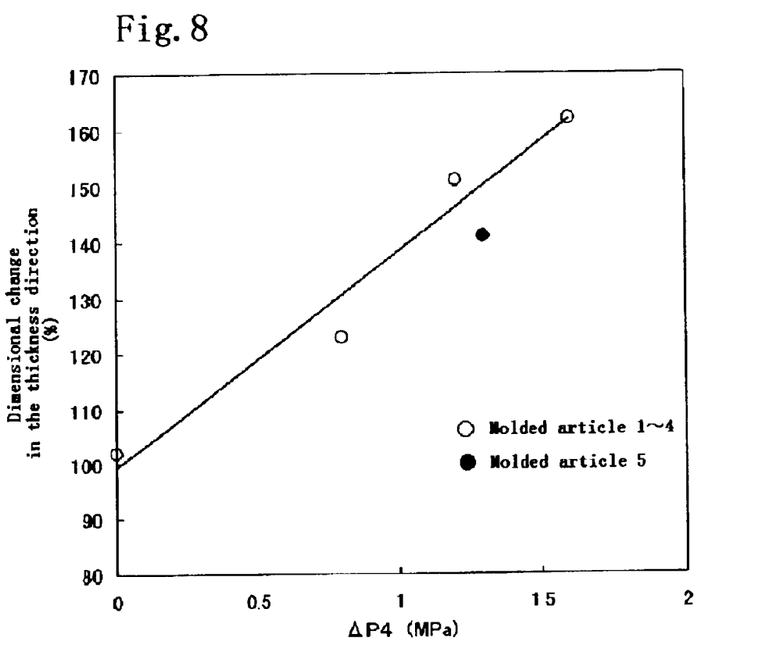
FIG. 8 is a graph showing the correlation between dimensional change in the thickness direction and $\Delta P4$.
Figure 9:
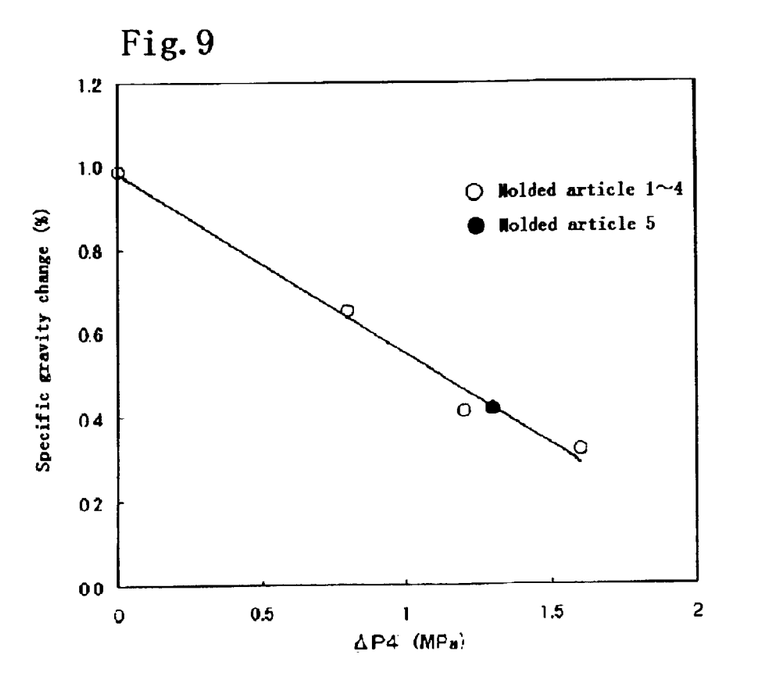
FIG. 9 is a graph showing the correlation between specific gravity change and $\Delta P4$.

(4) Correlation Between Dimensional Change and $\Delta P4$, and Correlation Between Specific Gravity Change and $\Delta P4$ The correlations between the dimensional changes obtained in (3) and $\Delta P4$ are shown in FIGS. 6 through 9. FIG. 6 shows the correlation between dimensional change in the lengthwise direction and $\Delta P4$, FIG. 7 shows the correlation between dimensional change in the widthwise direction and $\Delta P4$, and FIG. 8 shows the correlation between dimensional change in the thickness direction and $\Delta P4$. FIG. 9 shows the correlation between specific gravity change and $\Delta P4$.

(5) Adjustment of Foamed Body Dimensions Based on Correlation Between Dimensional Change and $\Delta P4$ Molding Material 4 shown in Table 1 was used to fill a die set in the press molding apparatus described in [1] above, the die temperature was set to 170° C. and the clamping pressure to 4 MPa, and pressure inside the die was measured with the pressure sensor. As a result, since $\Delta P4$ was low and the foaming factor was reduced, results were used as feedback for adjustment of pressure applied by the driving source 13, the clamping pressure was set to 8 MPa, and the article was removed from the die when $\Delta P4$ reached 7 MPa (after 6 minutes 30 seconds). The dimensional change and specific gravity were measured for molded article 5 as the obtained foamed body, and are indicated by a black circle in FIG. 6 through FIG. 9.

TABLE 1

| | Molding material 1 | Molding material 2 | Molding material 3 | Molding material 4 |
|---|---|---|---|---|
| Thermoplastic elastomer | | 55 | | |
| Isoprene rubber | | 10 | | |
| Butadiene rubber | | 35 | | |
| Light calcium carbonate | | 10 | | |
| Stearic acid | | 0.5 | | |
| Zinc oxide | | 0.5 | | |
| Anti-aging agent | | 2.0 | | |
| Pigment | | 1.5 | | |
| Crosslinking agent | | 0.5 | | |
| Blowing agent | 0.0 | 1.25 | 1.75 | 2.25 |
| Total (parts) | 115.0 | 116.25 | 116.75 | 117.25 |

TABLE 2

|  | Blowing agent content (parts) | Clamping pressure (MPa) | Pressure in die (MPa) | | | Dimensions (mm) | | | Specific gravity | Dimensional change (%) | | |
| --- | --- | --- | --- | --- | --- | --- | --- | --- | --- | --- | --- | --- |
|  |  |  | ΔP2 | ΔP3 | ΔP4 | Length | Width | Thickness |  | Length | Width | Thickness |
| Molded article 1 (non-foamed body) | 0 | 4 | — | — | 0 | 191.0 | 97.0 | 4.09 | 0.983 | 96 | 97 | 102 |
| Molded article 2 (foamed body) | 1.25 |  | 0.4 | 0.4 | 0.8 | 215.0 | 109.5 | 4.90 | 0.649 | 108 | 110 | 123 |
| Molded article 3 (foamed body) | 2.25 |  | 0.4 | 0.8 | 1.2 | 242.8 | 125.2 | 6.05 | 0.411 | 121 | 125 | 151 |
| Molded article 4 (foamed body) | 3.75 |  | 0.4 | 1.2 | 1.6 | 267.5 | 137.7 | 6.48 | 0.319 | 134 | 138 | 162 |
| Molded article 5 (foamed body) | 3.75 | 8 | 0.8 | 0.5 | 1.3 | 251.8 | 129.3 | 5.62 | 0.417 | 126 | 129 | 141 |

(6) Evaluation

The results for (2) through (4), as shown in FIG. 6 through FIG. 9, demonstrate that the change in the length direction, the width direction and the thickness direction, as well as the specific gravity, increases in almost direct proportion with increasing blowing agent content. Also, the results in (5) above demonstrate that the obtained foamed body approximately matched lines drawn based on the correlations for molding materials 1 through 4. Thus, each of these correlations may be used for adjustment of ΔP4 to obtain foamed body of the desired dimensions.

What is claimed is:

1. A process comprising producing a foamed body while adjusting the dimensions thereof based on ΔP4, wherein ΔP4 is the sum of the following ΔP2 and ΔP3:

ΔP2: The amount of reduction (absolute value) in pressure in the die from P2, where P2 is pressure at the point where pressure in the die begins to fall after casting the molding material containing no blowing agent into the die;

ΔP3: The amount of increase (absolute value) in pressure in the die from P3, where P3 is the minimum pressure between the time of casting the molding material containing the blowing agent into the die completely and the time of beginning to increase the pressure in the die.

2. A process for producing a foamed body according to claim 1, wherein said molding material is a shrinking molding material.

3. A process for producing a foamed body according to claim 1, wherein the foamed body is removed from the die when said ΔP4 reaches a prescribed value.

4. A process for producing a foamed body according to claim 1, wherein the dimensions of numerous foamed body obtained by altering factors which change said ΔP4 are measured to establish a correlation between said ΔP4 and said dimensions in advance, and said ΔP4 is adjusted by altering the factors using said correlation.

* * * * *